United States Patent [19]

Anderson

[11] Patent Number: 4,478,311
[45] Date of Patent: Oct. 23, 1984

[54] SAFETY HARNESS FOR HUNTERS

[76] Inventor: Jeffrey J. Anderson, P.O. Box 527, Chester, N.J. 07930

[21] Appl. No.: 289,820

[22] Filed: Aug. 3, 1981

[51] Int. Cl.³ .............................................. A62B 35/00
[52] U.S. Cl. .......................................... 182/3; 119/96; 224/151
[58] Field of Search ...................... 182/3, 6, 7, 9, 4, 8, 182/5; 297/468; 119/96, 101, 102; 24/115 H, 171, 181, 200, 164, 168, 196, 197, 194; 224/151, 155, 156, 258, 259, 214, 215, 216; 280/1.5

[56] References Cited

U.S. PATENT DOCUMENTS

| | | |
|---|---|---|
| 292,769 | 1/1884 | Underwood . |
| 422,345 | 2/1890 | Harman ........................... 182/7 |
| 716,109 | 12/1902 | Rodde . |
| 1,490,066 | 4/1924 | Carr . |
| 2,275,450 | 3/1942 | Manson . |
| 2,651,446 | 9/1953 | Rose . |
| 2,663,031 | 12/1953 | Kalthoff . |
| 2,853,220 | 9/1958 | Thomas . |
| 2,931,629 | 4/1960 | Keller ............................ 119/96 |
| 2,960,180 | 11/1960 | Wachtel . |
| 3,035,278 | 5/1962 | Golding ......................... 119/96 |
| 3,038,644 | 6/1962 | Johnson ........................ 224/259 |
| 3,074,074 | 1/1963 | Lovering . |
| 3,258,788 | 7/1966 | Anciaux . |
| 3,322,102 | 5/1967 | Windle . |
| 4,103,758 | 8/1978 | Himmelrich . |
| 4,120,377 | 10/1978 | Charles . |
| 4,194,257 | 3/1980 | Martin ........................... 182/3 |

FOREIGN PATENT DOCUMENTS

| | | | |
|---|---|---|---|
| 2930570 | 2/1981 | Fed. Rep. of Germany | 182/3 |
| 643655 | 8/1962 | Italy ............................ | 182/3 |
| 17875 | 10/1927 | Netherlands ................. | 182/3 |
| 2039209 | 8/1980 | United Kingdom .......... | 182/3 |

Primary Examiner—Reinaldo P. Machado
Assistant Examiner—Alvin Chin-Shue
Attorney, Agent, or Firm—Fisher, Christen & Sabol

[57] ABSTRACT

A multi-purpose harness which can be used as a seat when attached to an overhead support, as a safety belt when standing or sitting in a precariously exposed position or as a towing device, is composed of a single length of webbing, or similar narrow-band material, wrapped around the body one or more times to form one, or a multiple of loops which can be confined to respective spaced position by means of slidable spacers with the tension controlled by an attached buckle, or snubbing device using two interengaging ring-shaped members, so that the free end of the webbing can be attached to a support or to the object to be towed.

7 Claims, 6 Drawing Figures

SAFETY HARNESS FOR HUNTERS

BACKGROUND OF THE INVENTION

The present invention relates to a harness which among many others uses is particularly adaptable to hunters for enabling them to sit or stand at a elevated position by providing a seat suspended from a tree limb which allows both hands to be free, and alternatively in the case of large animals, to allow them to drag their quarry over the ground by attaching the harness over the shoulders.

Harnesses made of webbing arranged to form a suspended seat are disclosed in U.S. Pat. Nos. 4,103,758, 2,960,180 and 2,663,031 and a harness which may be attached to the shoulders is shown in U.S. Pat. No. 3,258,788. These harnesses are not specifically intended for dual use and in any event are complex in design and difficult to fabricate.

Other types of harness of somewhat less utility, are shown in U.S. Pat. Nos. 4,120,377; 3,322,102; 3,074,074; 2,853,220; 2,651,446; 2,275,450; 1,490,066; 716,109 and 292,769.

BRIEF SUMMARY OF THE INVENTION

The harness comprises a length of strong fabric webbing, or similar narrowband material, which may be several inches in width which is loosely passed around the body of the user one or more times and then controlled by a buckle, or snubbing device so that when the two loops thus formed are drawn up to the preferred amount of tightness the webbing can be locked to maintain the proper tension in the loops. One end of the webbing extends away from the body and is of sufficient length that it can be attached to, or wrapped around, a fixed support. The free end of the webbing has an attached snap hook so that if the end of the webbing is wrapped around a support, such as the trunk of a tree, the snap hook is snapped onto the webbing itself to form a loop encircling the support. A pair of loosely fitting separators extends between the two loops to prevent them from becoming spaced too far apart, for example when one loop passes around the back of the user and the other loop runs under the thighs to provide a seat and back rest. The loops can be arranged with the buckle, or snubbing device in the front so that the free end extends away from the front of the body or the arrangement can be reversed to allow the free end to extend from the back.

Alternatively, the user may put his arms through the respective loops so that they rest on his shoulders with the free end of the webbing extending behind him and attached to an object to be towed on the ground.

The snubbing device comprises a metal link having two parallel spaced bars through which a small loop, or bight of webbing is passed and a single bar, forming part of a metal D-ring or similar link, passes through the bight of webbing. The diameter of this single bar is such that the bight of webbing cannot be pulled out of the first link when tension is applied but becomes immovably jammed in place to prevent the webbing loops around the body from becoming loosened. On the other hand, by pulling the D-ring away from the link the webbing can easily slide through to allow adjustment of the loops.

DETAILED DESCRIPTION OF THE PREFERRED EMBODIMENTS

Figure 1:
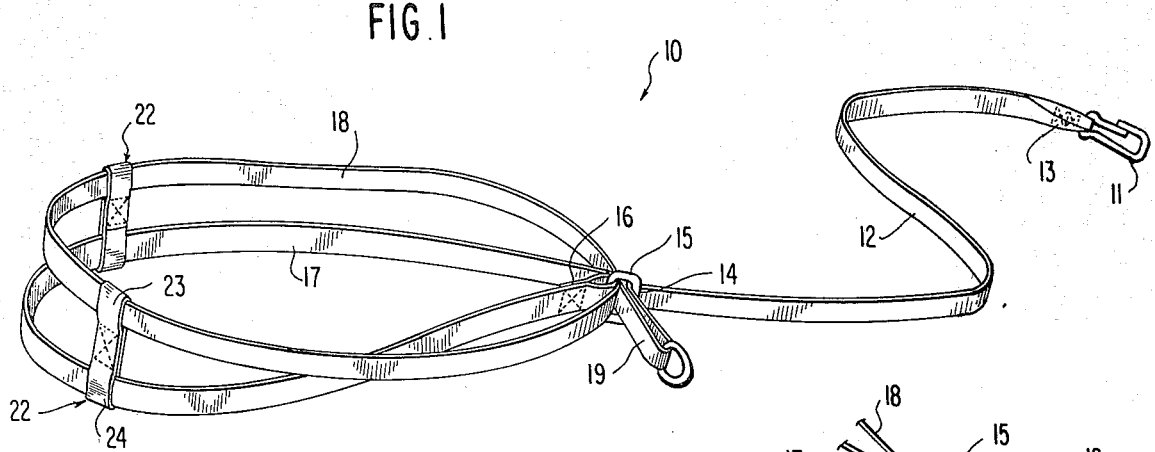
FIG. 1 is a perspective view, of a preferred form of harness according to this invention showing the relationship of the various elements when in an unstressed condition.
Figure 2:
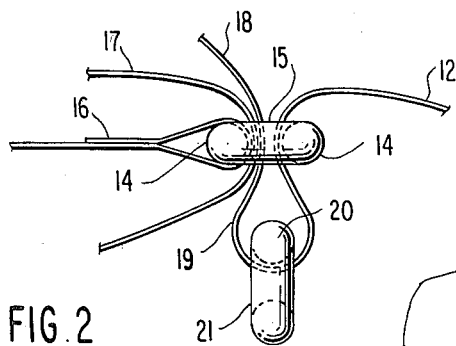
FIG. 2 is a fragmentary plan view of the snubbing device.

As shown in the drawing the basic component of the harness comprises a single narrow band of flexible inelastic material, indicated generally by numeral 10, such as dacron, nylon, or cotton woven webbing or equivalent material of sufficient strength to support the weight of a user in the event that it becomes necessary. At one end of the band, or webbing, a snap hook 11 is secured, by inserting the end of the webbing into the base of the snap hook and turning the end back on a first portion 12 of the webbing and sewing the end thereto as indicated at 13. In a similar manner, the other end of the webbing is secured to one of the parallel spaced bars 14 of a metal link 15, as by wrapping the end of the webbing around the bar and sewing it to the remainder of the webbing, as indicated at 16.

Figure 3:
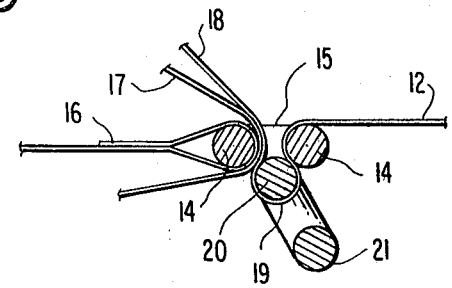
FIG. 3 is a fragmentary horizontal cross section showing the snubbing device in locking position.

The total length of the webbing 10 is such that that portion connected to link 15 can be wrapped around the waist of the user at least once, and preferably, twice to form two waist encircling loops 17 and 18 at the termination of which a bight 19 is formed in the webbing which is then passed through the link 15 between the two parallel bars 14. A snubbing device, such as the straight bar-like portion 20 of a D-shaped ring 21, is then inserted into the bight 19 of the webbing after it has been passed through link 15. The diameter of the element 20 must be large enough so that when tension is exerted on the free portion 12 of the webbing the bight 19 will be jammed between the element 20 and the two bars 14, as can be seen in FIG. 3.

For convenience, especially when the harness is to be used as a seat, a pair of spreaders, indicated generally by numeral 22 can be provided. Each of these spreaders may be formed from the same material as is used in making the band 10. Thus, both ends 23 and 24 of a short length of webbing material may be folded inwardly and sewed to the center of the material in overlapping relationship to form two spaced loops. One of the loops 17 of the harness which is to encircle the waist of the user can be passed through the lower loop of each spreader, while the loop 18 is passed through the upper loops of the spreaders.

Figure 4:
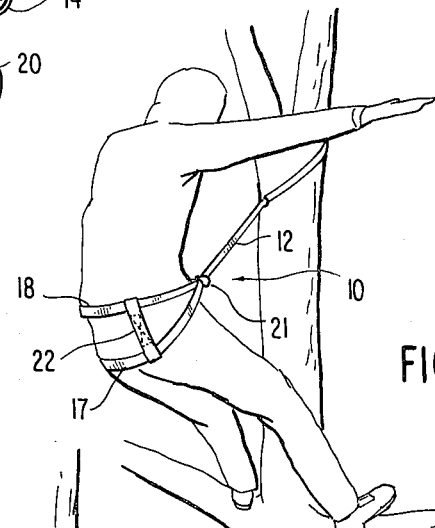
FIG. 4 is a view of the harness when used as a tree seat.

As previously stated, the harness may be used with only one turn of webbing wrapped around the user but preferably the harness will be assembled with two turns of webbing assembled with the link 15 and D-ring 21 in place, as shown in FIG. 1. When the harness is to be used as a seat when the user is in an elevated position, say with both feet placed on the branches of a tree, as shown in FIG. 4, the loops 17 and 18 are expanded by separating the bar 20 from the parallel bars 14 and then placed so that one loop passes around the back, while the other loop extends under the thighs. The loops are then tightened to the extent desired by the user by pulling outwardly on the first portion 12 of the webbing.

While doing this the snubbing mechanism compressing the link 15 and D-ring 21 are held at the front of the body while the D-ring 21 is kept out of engagement with link 15 after which it may be released to lock the loops 17 and 18 with the desired degree of tension. In this connection it should be noted that, as an added refinement, the bars 14 and 20 may comprise a series of rollers mounted on the link 15 and D-ring 21 for rotation about their respective axes. After the loops have been tightened and locked the end of the webbing 12 may be passed around the trunk of the tree, or another branch at a higher elevation and the snap hook 11 is snapped onto the webbing 12.

Figure 5:
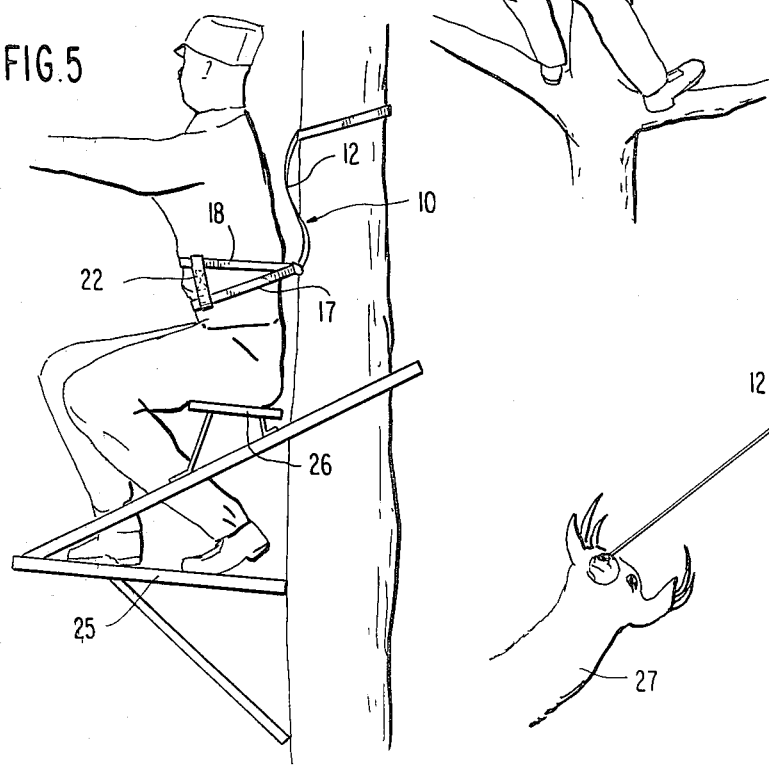
FIG. 5 is a view of the harness when used as a safety belt.

In some cases, a hunter will attach a horizontal foot rest 25 and a seat 26 to the trunk of a tree by means of suitable brackets, as shown in FIG. 5. In that case the harness may serve as a safety belt by reversing the position of the snubbing mechanism to place it at the user's back. The free end 12 of the webbing is wrapped around the tree trunk as before and held in place with the snap hook 11.

Figure 6:
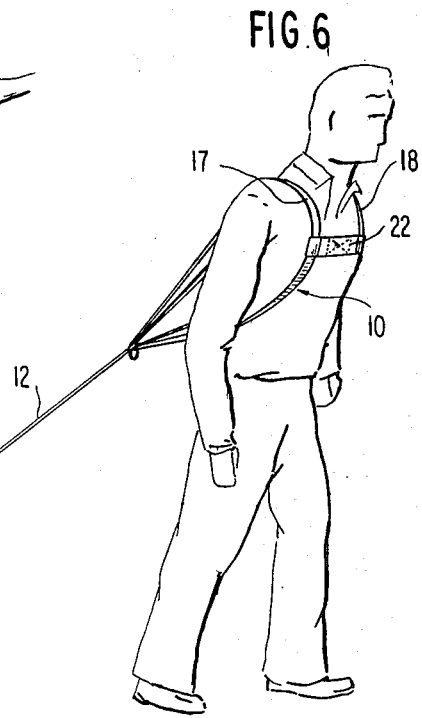
FIG. 6 is a view of the harness being used to drag a load on the ground.

A further use of the harness is shown in FIG. 6, where the free end 12 of the webbing has been wrapped around a portion of an object to be dragged along the ground. In this case it happens to be a deer carcass 27 and the end of the webbing has been wrapped around the antlers. Of course, if the object is provided any sort of ring-shaped protuberance, the snap hook could be simply snapped onto the ring. In FIG. 6, the two loops 17 and 18 of the harness are placed on the respective shoulders of the user with one of the spreadors 22 placed across the chest. Since the spreadors are freely movable on the webbing they can be located in any position that is most comfortable. Furthermore, especially in the case of a heavy load, the loops 17 and 18 may be wrapped around the waist, as in FIG. 5, so that by leaning forwardly the user may take advantage of his own weight as the load is pulled.

It should be understood that, while a particular form of snubbing device has been described in the preferred embodiment, other devices, such as a buckle, capable of adjustable fixing the relative length of the webbing wrapped around the user, may be used.

It should also be understood that, while each of the loops 17 and 18 are shown as completely enclosing the body of the user, in a modified form of harness, each of these loops may be doubled upon themselves to lie across only one side of the user's body, in opposite directions away from the snubbing device 15. The remote portions of the loops 17 and 8 will then be joined by a ring member, or otherwise, to one or more additional closed loops of material to complete the enclosing of the body of the user.

What I claim is:

1. A harness for selective use as a seat or safety belt by a hunter perched in an elevated position or for dragging a load on the ground while walking, comprising:
    (a) a single length of flexible webbing provided at one end with means for detachably connecting in an adjustable manner a first portion of said webbing selectively around a fixed support or around a load to be dragged, said fixed support or said load can be of differing girth;
    (b) the length of said webbing being sufficient to permit a second portion of the webbing to completely encircle a portion of a hunter's body twice and to allow a remaining portion of the webbing to position said connecting means spaced from the hunter's body; and
    (c) snubbing means comprising two relatively movable elements for coacting in frictional locking engagement with said webbing and with each other to adjust the length of the body encircling portion; one of the two elements of said snubbing means comprising a member having an opening defined by opposing margins disposed parallel to each other in a direction transverse to said webbing and of sufficient size to permit a doubled over portion of said webbing to be inserted through said opening from one side of the opening to define a loop projecting from the other side of the opening, the other said two elements being ring-shaped and including an elongated member inserted transversely through said projecting loop and having a width sufficient to prevent said last mentioned member being pulled through said opening.

2. Harness as defined in claim 1, only one of said two elements of the snubbing means is secured to the other end of said webbing.

3. Harness as defined in claim 2, wherein said one element is provided with an opening through which a looped portion of a medial length of said webbing projects to be freely slidable to adjust said length of the body encircling portion, the other of said two elements being held by said looped portion to be urged into said locking engagement when tension is exerted on said one end of the webbing.

4. Harness as defined in claim 3, wherein said two elements are relatively movable in one direction into said locking engagement and are manually movable when under tension in the opposite direction to release said locking engagement.

5. Harness as defined in any one of claims 1, 2, 3 or 4, which includes spreader means coacting with said second portion of the webbing spaced from said locking means to urge said second portion to define two diverging loops to provide a seat.

6. Harness means defined in claim 5 wherein said spreader means comprises an elongated band of flexible material having its respective free ends wrapped transversely around a respective one of said loops and joined to the mid portion of the band.

7. A safety harness of the type wherein the user's body is enclosed within an adjustable cradle which includes at least two closed loops of flexible band material, comprising:
    adjustment means comprising first and second relatively movable members for changing the size of said closed loops, each of said members being provided with an opening through which said flexible band material may freely pass;
    one end of said flexible band material being secured only to the first of said members and a free portion of the band material then passing through the opening in the first member to form one of said closed loops, a further free portion of said band material thereafter being returned to pass through the opening in the first member to form the other of said two closed loops;
    a further free portion of said band material then passing through the opening in said second member and thereafter returning again to pass through the opening in said first member;

the remainder of said free portion of flexible band material being provided with means for detachable connection with a support;

an external dimension of said second member being greater than the internal dimension of the opening in said first member to cause frictional engagement of said flexible band material between said first and second members to lock the size of said closed loops when tension is applied to said remainder of the free portion of flexible band material.

* * * * *